United States Patent [19]

Lawrence

[11] 3,860,673

[45] Jan. 14, 1975

[54] ELASTOMERIC COMPOSITIONS

[75] Inventor: John Brian Lawrence, Meerbusch-Struemt, Germany

[73] Assignee: E. I. du Pont de Nemours and Company, Wilmington, Del.

[22] Filed: July 31, 1973

[21] Appl. No.: 384,358

[52] U.S. Cl..... 260/859 R, 260/77.5 NC, 260/83.3, 260/85.1, 260/87.5 A, 260/92.3, 260/726, 260/858, 260/859 PV
[51] Int. Cl............................................ C08g 22/00
[58] Field of Search ....... 260/859 R, 92.3, 77.5 NC, 260/85.1, 83.3, 87.5 A, 726, 858, 859 PV

[56] References Cited
UNITED STATES PATENTS

| | | | |
|---|---|---|---|
| 3,743,617 | 7/1973 | Kerst | 260/859 R |
| 3,763,110 | 10/1973 | Oentel et al. | 260/92.9 |

Primary Examiner—M. J. Welsh

[57] ABSTRACT

Improved elastomeric compositions, useful as adhesives or surface coating compositions, comprise (A) a synthetic or naturally-occurring elastomer, e.g., chloroprene polymer; (B) an organic polyisocyanate, particularly a di-, tri-, or tetra-isocyanate, which has been at least partially trimerized, e.g., to an extent of at least 5 percent; and (C) a catalyst which is effective to trimerize (B).

The compositions are generally in the form of a two-part system in which the trimerization catalyst and the isocyanate are kept out of mutual contact until just prior to use. A preferred system is one in which the trimerization catalyst and elastomer are incorporated in one pack and the partially trimerized isocyanate is incorporated in another pack, the two packs being present together in a single package which may include mixing instructions.

17 Claims, No Drawings

ELASTOMERIC COMPOSITIONS

The invention concerns improvements in elastomeric compositions which are useful as adhesives and as surface coating compositions and in particular the invention is concerned with such compositions that include an organic isocyanate as the curing agent.

Compositions which comprise solutions of naturally occurring or synthetic elastomers in volatile organic solvents have been used for a variety of industrial applications including, in particular, as adhesives, e.g., in the shoe industry. It is desirable that such adhesive compositions should possess heat resistance so that they are not detereiorated under the conditions used in any given process and furthermore, for efficient operation, it is desirable that the composition should be capable of rapidly developing optimum bond strength. In order to improve the bond strength of elastomeric adhesive compositions it has been proposed to add thereto organic triisocyanates, e.g. 4,4′,4″-triphenyl methane triisocyanate. With such triisocyanates a high degree of bond strength can be developed over one or two days.

It is an object of the present invention to provide an elastomeric composition which finds application as an adhesive or as a surface coating composition and which possesses improved properties over similar known compositions containing organic isocyanates.

According to one embodiment of the invention there is provided an elastomeric composition comprising (A) a synthetic or naturally occurring elastomer; (B) an organic polyisocyanate, particularly a di-, tri- or tetraisocyanate, which has been at least partially trimerized, e.g., to an extent of at least 5 percent; and (C) a catalyst which is effective to trimerize (B).

The compositions according to the invention are generally as a two-part system in which the trimerization catalyst and the isocyanate are kept out of mutual contact until just prior to use. Thus, a preferred two-part system according to the invention is one in which the trimerization catalyst and elastomer are incorporated in one container and the partially trimerized isocyanate is incorporated in another.

The resulting pack may thus take the form of two containers such as tubes or cans containing the respective components presented in a box or other suitable package. The pack may include instructions for admixing the two components homogeneously in order to produce an elastomeric composition according to the invention.

Preferred elastomers (A) include neoprenes, i.e., chloroprene polymers and copolymers. Other elastomers which may be employed include natural rubber, styrene-butadiene rubber (SBR), for example low styrene SBR or carboxylated SBR, prevulcanized natural rubber, acrylonitrilebutadiene rubber (nitrile rubber) and fluoroelastomers, e.g., copolymers of vinylidene fluoride and hexafluoropropylene. Suitable blends of any of these may be employed. Still further elastomers which may be employed include chlorosulphonated polyethylene, copolymers of isobutylene and isoprene, copolymers of ethylene and propylene, terpolymers of ethylene, propylene and a diene, polyacrylates and polyurethanes.

The elastomer (A) is preferably employed as a solution in an organic solvent (D) which has a boiling point such that it readily evaporates when the composition is applied to the chosen substrate. The organic polyisocyanate (B) is preferably also employed as a solution in an organic solvent which is desirably the same solvent as (D) used above for the elastomer (A) in order to preclude any problems of incompatibility. The employment of a solvent with either component (A) or (B) makes the material in question easier to handle. Polyisocyanate (B) may be used at solids contents of 30–60 percent.

Any solvent that is inert with respect to the polyisocyanate may be used. If desired, mixtures of solvents may be used. Depending on the nature of the elastomer, suitable solvents include aliphatic hydrocarbons, e.g., hexane; aromatic hydrocarbons, e.g., toluene and xylene; halogenated hydrocarbons, e.g., fluorocarbons, trichloroethylene, methylene chloride and 1,1,1-trichloroethane; ketones, e.g., methyl ethyl ketone and methyl isobutyl ketone; and esters, e.g., butyl acetate or ethyl acetate.

The use of a solvent (D) will ordinarily be indicated where the composition is to be used as an adhesive or surface coating composition. Where the composition is to be employed as a sealant or mastic the solvent (D) may be omitted.

Any organic polyisocyanate or mixtures of such polyisocyanates containing at least some trimer may be utilized in the compositions according to the invention. Examples of such polyisocyanates include tolylene 2,4- and 2,6-diisocyanates, m and p-phenylene diisocyanate, 3,3′-dimethyl-4,4′-diisocyanatodiphenylmethane, diphenylene-4,4′-diisocyanate, 4,4′-diisocyanatodiphenyl ether, 4,4′-methylene bis (phenyl isocyanate), 4,4′-methylene bis (cyclohexyl isocyanate), naphthylene-1,4-diisocyanate, hexamethylene diisocyanate, m- and p-xylene diisocyanate, toluene-2,4,6-triisocyanate, 2,4,4′-triisocyanate diphenyl, triphenylmethane triisocyanate and thiophosphoric acid tris-(p-isocyanatophenyl) ester.

Aromatic diisocyanates are preferred and tolylene-2,4-diisocyanate alone or in admixture with tolylene-2,6-diisocyanate is especially preferred.

Partial trimerization of the organic polyisocyanate can be accomplished by known materials in the presence of a variety of catalysts such as those disclosed in "Polyurethanes, Chemistry and Technology, Part I," Saunders and Frisch, Interscience Publishers, 1962, pages 94–97. Tetramethyl guanidine is a preferred catalyst for partial trimerization because its catalytic activity can be fully eliminated by the addition of a slight excess of benzoyl chloride when the partial trimerization has progressed to the desired extent. Both refined and so-called "crude" polyisocyanates (containing by-products formed during the phosgenation of polyamines) can be used as starting materials for the preparation of the partially trimerized polyisocyanate. Equivalent compositions prepared by adding pure or concentrated trimers to untrimerized polyisocyanates are also meant to be included as being useful in the present elastomeric compositions.

The concentration of trimer in the partially trimerized polyisocyanate used in this invention can be expressed in terms of the degree of trimerization expressed in percent. The degree of trimerization in percent is given by the following equation: Degree of Trimerization (%) = 100 X (% NCO Initial Polyisocyanate-% NCO Partially Trimerized Polyisocyanate) ÷ (% NCO Initial Polyisocyanate/n)

where $n$ = the number of isocyanate groups in each molecule of the initial polyisocyanate. The degree of trimerization of partially trimerized polyisocyanate used in this invention should be at least 5 percent and preferably from 15 to 150 percent. Polyisocyanates having degrees of trimerization about 150 percent can be used, but in general are uneconomical because of the larger amounts required to supply sufficient NCO groups for the elastomer compositions. When the compositions of this invention are based on tolylene diisocyanate, it is preferred that the diisocyanate be trimerized to 100–140 percent, advantageously 120–140 percent, to minimize the concentration of free tolylene diisocyanate. Without adequate ventilation, compositions containing significant amounts of free tolylene diisocyanate may present a health hazard.

The partially trimerized polyisocyanate is used in quantities sufficient to supply 1.0 to 10 percent, preferably 1.5–5.0 percent, by weight of free NCO groups based on the weight of elastomer (A). The optimum amount of polyisocyanate to be used with any particular elastomer may readily be ascertained by one skilled in the art. For example, in the case of polychloroprene it will be found to be convenient to use 1.5–4.0 percent by weight of polyisocyanate, expressed as NCO.

The catalyst (C) used in the elastomeric compositions of this invention may be any compatible trimerizing catalyst, i.e., a catalyst capable of bringing about trimerization of an organic isocyanate such as phenyl isocyanate. This function of the catalyst is not known with certainty, but it is believed that it promotes reaction between the polyisocyanate and the elastomer in addition to trimerization. A wide variety of trimerization catalysts are known (see reference to Saunders and Frisch cited hereinbefore) including aliphatic tertiary amines, basic salts and soluble organo-metallic compounds. If desired, mixtures of catalysts may be used.

Aliphatic tertiary amines are preferred in the present compositions.

Representative examples of tertiary amines include trialkylamines such as triethylamine, permethylated diethylene triamines or triethylene tetramine, N-alkyl morpholines such as N-methyl morpholine or N-ethyl morpholine, triethanolamine, triethylene diamine (1,4-diazabicyclo-2,2,2-octane) or dialkylaminomethyl phenols such as (dimethylaminomethyl) phenols and 2,4,6-tri(dimethylaminomethyl) phenol. Two or more tertiary amines may be used as the catalyst. Alkylated guanidines such as tetramethyl guanidine and 2-dodecyl-1,1,3,3-tetramethyl guanidine are also useful. Especially preferred catalysts in the present compositions include 2,4,6-tri(dimethylaminomethyl) phenol and triethylamine.

The catalyst may be employed in quantities of from 0.01 to 200 percent by weight based on the NCO content of the polyisocyanate.

The amount of catalyst will vary according to the type of polyisocyanate, the degree of trimerization and the rate of cure and pot life desired. In the case of polychloroprene, the preferred trimerized tolylene diisocyanate (degree of trimerization 120–130 percent) and 2,4,6-tri(dimethylaminomethyl) phenol, 25–100 percent by weight of catalyst based on the weight of NCO groups furnished by the trimerized isocyanate is a useful range. Optimum amounts for other systems may readily be ascertained by those skilled in the art.

Other components that may be used in the compositions according to the invention include anti-oxidants, anti-ozonants and acid acceptors although the choice of component in a given composition will depend on the particular elastomer used. Suitable anti-oxidants include various aromatic amines and various alkylated phenols while suitable acid acceptors include zinc oxide and magnesium oxide. Other materials which may be used include resins, e.g., wood rosin and its esters, terpene phenolic resins, and p-terbutyl phenolic resins and chlorinated rubbers.

The compositions according to the invention remain workable for a useful length of time, e.g., at least 20 minutes. Compositions based on trimerized tolylene diisocyanate and polychloroprene generally remain workable for about 8 hours or more.

In order that the invention may be better understood the following example is given by way of illustration only. The chloroprene polymer referred to in the Examples is available from E. I. du Pont de Nemours & Company as "Neoprene" AD-30.

EXAMPLE 1

Various compositions were prepared according to the following formulation wherein parts and percentages are by weight: the compositions were prepared by mill mixing.

| | |
|---|---|
| Chloroprene polymer | 100 parts |
| Butylated p-phenylphenol (antioxidant) | 2 parts |
| Oil-Soluble Terpene-phenolic resin, mp. 133–152°C., Sp. gravity 1.09 | 25 parts |
| Chlorinated rubber, 64–65% chlorine, viscosity 20% solution in toluene 17–25 cps | 15 parts |
| Magnesium oxide | 4 parts |
| Zinc Oxide | 5 parts |
| Amine catalyst | * |
| Toluene/hexane/methylethyl ketone (1:1:1) | 453 parts |

* Parts calculated to allow 1 part for every 2 parts of polyisocyanate calculated as NCO.

Just prior to use, the compositions were blended with 3.5 percent of a 40 percent solution in methylene chloride of a crude polyisocyanate. (The latter consisted of an unrefined primary toluene diamine phosgenation product, stripped of solvent and containing 34 percent NCO and having a degree of trimerization of 19 percent. The resulting blends were applied as thin films to pairs of strips of neolite shoe soling composition, allowed to dry for 30 minutes, reactivated for 1 minute at 80°C. under infrared radiation, and then the strips were pressed together at 4 kg/sq.cm. for 15 seconds. The results are shown in the following table. Bond strengths (kg/cm) were determined by peeling the strips apart at a rate of 5 cm/min. at 70°C., two determinations being made, one after ageing the bond at room temperature for 30 minutes and the other after similar ageing for 24 hours. Gel time (in hours) indicates the length of time for which the product still remains brushable.

| AMINE CATALYST | BOND STRENGTH | | GEL TIME |
|---|---|---|---|
| | 30 mins. | 24 hrs. | |
| No catalyst | 0.08 | — | No gel formation |

-Continued

| AMINE CATALYST | BOND STRENGTH | | GEL TIME |
|---|---|---|---|
| | 30 mins. | 24 hrs. | |
| 2,4,6-Tri(dimethyl-aminomethyl)phenol | 0.24 | 0.29 | 7 |
| Mixture of 2- and 4-(dimethylaminomethyl) phenols | 0.20 | 0.22 | 7 |
| Triethylamine | 0.24 | 0.32 | 6 |
| Triethylene diamine | 0.25 | — | 6 |
| N-ethylmorpholine | 0.20 | — | 25 |
| N,N,N',N'-tetra-methylguandine | 0.21 | 0.29 | 9 |

EXAMPLE 2

The improvement in early hot bond strength that results from increasing the level of trimer in the isocyanate portion of a two part polychloroprene-isocyanate adhesive is illustrated as follows:

A. Preparation of Compounded Polychloroprene Cement - Part A

Mill Mix - The chloroprene polymer was compounded by mixing ingredients on a rubber mill at 50°C. for 10–15 minutes using the following recipe:

| | Parts |
|---|---|
| Chloroprene Polymer | 100 |
| Magnesia | 4 |
| Zinc oxide | 5 |
| Butylated p-phenylphenol | 2 |

| Adhesive | Parts |
|---|---|
| Mill mix | 111 |
| Terpene-phenolic resin used in Example 1 | 25 |
| Chlorinated rubber used in Example 1 | 15 |
| 2,4,6-Tri(dimethylaminomethyl) phenol | 1.15 |
| Toluene/hexane/methylethyl ketone (1:1:1) | 453 |

B. Preparation of Isocyanate Solutions - Part B

The trimer used in this example was prepared from 80/20 mixture of 2,4- and 2,6-toluene diisocyanate. The trimer was isolated as a solid which had a molecular weight of 560 grams/mole. All isocyanate solutions were prepared by dissolving solid trimer and 2,4-toluene diisocyanate in methylene chloride to give solution containing either 6.0 or 12.0 grams of NCO groups per 100 grams of solution. C. Preparation and Testing of Neolite-Neolite Peel Specimens For each adhesive composition studied sufficient isocyanate solution (Part B) to give 2.9 percent NCO based on polychlorprene, i.e., 0.48 grams NCO per 100 grams of Part A, was mixed for 30 minutes with Part A. The mixed adhesive was applied to two brush coats to smooth Neolite allowing 5 minutes between applications. After allowing the adhesive 30 minutes to dry on the surface of the substrate, Neolite-Neolite peel specimens were prepared by heat reactivating the adhesive coated substrates for 25 seconds on a Compo Adhesive Activator No. 411K at full voltage, followed by pressing for 10 seconds at 55 psi. The peel specimens were aged at ambient temperatures for predetermined times then pulled apart at 70°C. and at an angle of 180° with a crosshead speed of two in/min.

| Weight Percent Toluene Diisocyanate Trimer | BOND STRENGTHS | |
|---|---|---|
| | 180° Peel Strength at 70°C. (pli) | |
| | After 30 minutes at ambient temperature | After 24 hours at ambient temperature |
| 0 | 0.7 | 4.0 |
| 10 | 1.2 | 6.1 |
| 30 | 2.0 | |
| 80 | 4.4 | 9.3 |
| 100 | 5.3 | 9.3 |

An equivalent prior art composition using thiophosphoric acid tris-(p-isocyanato-phenyl ester) in methylene chloride in place of the trimerized isocyanate in the absence of catalyst gave 2.1 pli and 5.4 pli after 30 minutes and 24 hours respectively.

EXAMPLE 3

In this example the trimer was prepared by trimerizing 2,4-toluene diisocyanate at 60°C. with tetramethylguanidine to a degree of trimerization of 126percent. The resulting isocyanate was blended with urethane grade ethyl acetate to 50 percent solids. This stock solution had a Brookfield viscosity of 110 cps at 26°C. and an isocyanate content of 9.6 percent. A. Preparation of Isocyanate Solution - Part B 20 Grams of the isocyanate stock solution described above were mixed with 30 grams of methylene chloride yielding a solution containing 3.85 grams NCO/100 grams of Part B.

The preparation of Part A, the peel specimens, and the test procedure were all carried out as described in Example 2.

NEOLITE-NEOLITE PEEL STRENGTHS

| Weight of NCO per 100 Grams of Part A | 180° Peel Strength at 70° C (pli) | | Brookfield Viscosity of Mixed Cement (cps) | |
|---|---|---|---|---|
| | After 30 minutes at ambient temperature | After 24 hours at ambient temperature | 3 hours after mixing | 24 hours after mixing |
| 0 | — | — | 2280 | — |
| 0.21 | 2.0 | 4.8 | 3640 | 3960 |
| 0.27 | 3.0 | 6.3 | 4200 | 4700 |
| 0.48* | 1.2 | 4.1 | 5520 | 5360 |

* The isocyanate solution in this prior art control was thiophosphoric acid tris-(p-isocyanato-phenyl ester).

EXAMPLE 4

Proceeding in a manner similar to that described in Example 1 an elastomer composition was prepared according to the following recipe:

| Mill Mix | |
|---|---|
| Chloroprene polymer | 100 parts |
| Butylated o-phenyl phenol (antioxidant) | 2 parts |
| Magnesium Oxide | 4 parts |
| Zinc oxide | 5 parts |
| Dissolve in Churn | |
| Above milled compound | 111 parts |
| Terpene phenolic resin, (as used in Example 1) | 25 parts |
| Chlorinated rubber, (as used in Example 1) | 15 parts |
| Toluene/hexane/methyl ethylketone (1:1:1) | 453 parts |
| Catalyst (Dispersed 24 hours before isocyanate addition) | |
| Triethylamine | 0.4 parts |
| Isocyanate ** 4.8 parts by weight per 100 parts by weight of the total composition. | |

** A primary diamine phosgenation product having a degree of trimerization of 125% and being at 50% solids content in ethyl acetate.

Adhesion test Formica/plywood shear bonds/even coating of adhesive on each surface; 20 minute open; pressed 10 seconds at 40 psi. Mean values in lb/sq.in. Tested at 21°c.

| Storage condition: | |
|---|---|
| 7 days at 21°C | 625 |
| 28 days at 21°C | 755 |
| 7 days at 21°C. followed by: | |
| 7 days in water + 1 day at 21°C. | 267 |
| 28 days in water+ 1 day at 21°C. | 238 |
| 7 days in oxygen at 300 psi + 1 day at room temperature | 460 |
| 28 days in oxygen at 300 psi + 1 day at room temperature | 523 |
| 7 days at 93% RH + 1 day at room temperature | 448 |
| 28 days at 93% RH + 1 day at room temperature | 353 |

I claim:

1. An elastomeric composition comprising (A) a synthetic or naturally occurring elastomer; (B) an organic polyisocyanate which has been at least partially trimerized and (C) a catalyst which is effective to trimerize (B).

2. A composition of claim 1 wherein the polyisocyanate is a di-, tri- or tetraisocyanate.

3. A composition of claim 1 wherein the polyisocyanate is trimerized to an extent of at least 5 percent.

4. A composition of claim 1 wherein elastomer (A) is a chloroprene polymer or copolymer.

5. A composition of claim 1 wherein elastomer (A) is employed as a solution in an organic solvent (D) which has a boiling point such that it readily evaporates when the said composition is applied to a substrate.

6. A composition of claim 1 wherein the organic polyisocyanate is an aromatic diisocyanate.

7. A composition of claim 6 wherein the aromatic diisocyanate is tolylene-2,4-diisocyanate or a mixture of tolylene-2,4- and -2,4-diisocyanates.

8. A composition of claim 1 wherein the polyisocyanate is trimerized to the extent of from 15 to 150 percent.

9. A composition of claim 1 wherein the polyisocyanate is used in quantities sufficient to supply from 1.0 to 10 percent by weight of free NCO groups based on the weight of elastomer (A).

10. A composition of claim 9 wherein the polyisocyanate is used in quantities sufficient to supply from 1.5 to 5 percent by weight of free NCO groups based on the weight of elastomer (A).

11. A composition of claim 1 wherein the catalyst is an aliphatic tertiary amine.

12. A composition of claim 1 wherein the catalyst is employed in quantities of from 0.01 to 200 percent by weight based on the NCO content of the polyisocyanate.

13. An elastomeric composition comprising (A) a chloroprene polymer or copolymer; (B) a diisocyanate compound consisting of tolylene-2,4-diisocyanate or a mixture of tolylene-2,4- and -2,6-diisocyanates, the said diisocyanate compound having been trimerized to an extent of 100–140 percent, and (C) a catalyst which is effective to trimerize (B).

14. A composition as claimed in claim 13 wherein the diisocyanate compound is used in quantities sufficient to supply from 1.5–4 percent by weight of free NCO groups based on the weight of chloroprene polymer or copolymer (A).

15. A process for the production of an elastomeric composition which comprises homogeneously mixing (A) a synthetic or naturally occurring elastomer; (B) an organic polyisocyanate which has been at least partially trimerized and (C) a catalyst which is effective to trimerize (B).

16. A pack comprising two containers for use in production of the elastomeric composition of claim 1, one of the said containers containing the catalyst (C) which is effective to trimerize a polyisocyanate (B) and the other containing an organic polyisocyanate (B) which has been at least partially trimerized.

17. The pack of claim 16 wherein the container for catalyst (C) also contains a naturally occurring or synthetic elastomer (A).

* * * * *